United States Patent
Burkhardt et al.

(10) Patent No.: US 8,353,198 B2
(45) Date of Patent: Jan. 15, 2013

(54) DIAGNOSTIC METHOD AND DEVICE FOR DIAGNOSING AN INTAKE SYSTEM OF AN INTERNAL COMBUSTION ENGINE

(75) Inventors: Thomas Burkhardt, Neutraubling (DE); Jürgen Dingl, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 444 days.

(21) Appl. No.: 12/600,946

(22) PCT Filed: May 20, 2008

(86) PCT No.: PCT/EP2008/056139
§ 371 (c)(1),
(2), (4) Date: Nov. 19, 2009

(87) PCT Pub. No.: WO2008/142058
PCT Pub. Date: Nov. 27, 2008

(65) Prior Publication Data
US 2010/0146966 A1 Jun. 17, 2010

(30) Foreign Application Priority Data
May 21, 2007 (DE) .................... 10 2007 023 559

(51) Int. Cl.
*G01M 15/09* (2006.01)
(52) U.S. Cl. ........................ 73/47; 73/114.37
(58) Field of Classification Search ............. 73/47, 49.7, 73/114.31, 114.32, 114.33, 114.37
See application file for complete search history.

(56) References Cited

U.S. PATENT DOCUMENTS

| | | | |
|---|---|---|---|
| 6,018,949 A | 2/2000 | Brosecke et al. | 60/602 |
| 6,499,299 B2 * | 12/2002 | Propernick | 60/602 |
| 6,644,284 B2 | 11/2003 | Pfitz | 123/479 |
| 7,484,367 B2 * | 2/2009 | Kishimoto et al. | 60/602 |
| 2002/0166322 A1 * | 11/2002 | Weinreuter | 60/602 |
| 2003/0084886 A1 | 5/2003 | Akao et al. | 123/559.1 |
| 2010/0224174 A1 * | 9/2010 | Tabata | 123/568.19 |
| 2011/0100106 A1 * | 5/2011 | Spargo | 73/114.37 |

FOREIGN PATENT DOCUMENTS

| | | |
|---|---|---|
| DE | 19639146 | 11/1997 |
| DE | 19649152 | 7/1998 |
| DE | 10065474 | 6/2002 |
| DE | 102004038733 | 2/2006 |
| DE | 102004036064 | 3/2006 |
| DE | 102005012946 | 9/2006 |

OTHER PUBLICATIONS

German Office Action for Application No. 10 2007 023 559.5 (3 pages), Jan. 16, 2008.
International Search Report and Written Opinion for Application No. PCT/EP2008/056139 (12 pages), Nov. 12, 2008.

* cited by examiner

*Primary Examiner* — Eric S McCall
(74) *Attorney, Agent, or Firm* — King & Spalding, L.L.P.

(57) ABSTRACT

An internal combustion engine has an intake system (1) and an exhaust gas system (4). An exhaust turbocharger of the internal combustion engine has a compressor (42) arranged in the intake system (1) and a turbine (48) arranged in the exhaust gas system (4) of the internal combustion engine for driving the compressor (42). In order to diagnose the intake system (1), a charge pressure (PHS_AIC_DOWN) of the compressor (42) is determined in a predetermined operating state of the internal combustion engine. A leakage of the intake system (1) downstream of the compressor (42) is recognized if the determined charge pressure (PHS_AIC_DOWN) is lower than the predetermined base charge pressure (PUT_BAS) in the predetermined operating state.

12 Claims, 3 Drawing Sheets

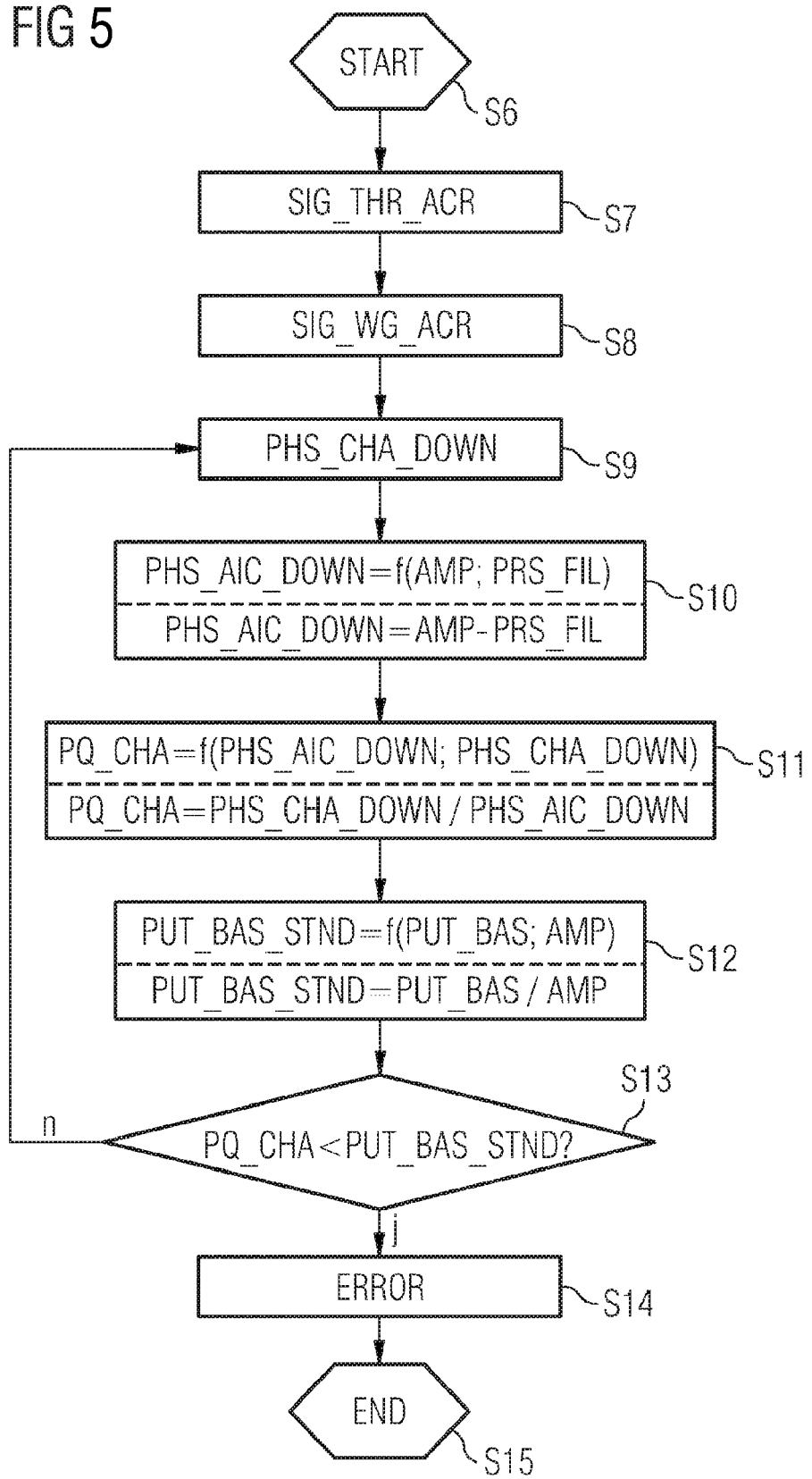

DIAGNOSTIC METHOD AND DEVICE FOR DIAGNOSING AN INTAKE SYSTEM OF AN INTERNAL COMBUSTION ENGINE

CROSS-REFERENCE TO RELATED APPLICATIONS

This application is a U.S. National Stage Application of International Application No. PCT/EP2008/056139 filed May 20, 2008, which designates the United States of America, and claims priority to German Application No. 10 2007 023 559.5 filed May 21, 2007, the contents of which are hereby incorporated by reference in their entirety.

TECHNICAL FIELD

The invention relates to a diagnostic method and a device for performing diagnostics on the intake tract of an internal combustion engine with exhaust gas turbocharger. The exhaust gas turbocharger comprises a compressor disposed in the intake tract. For the purpose of driving the compressor, the exhaust gas turbocharger incorporates a turbine disposed in an exhaust tract of the internal combustion engine.

BACKGROUND

To comply with regulations, automobile manufacturers are increasingly required to design their motor vehicles such that the latter can detect malfunctions themselves. Said malfunctions can affect, for example, an internal combustion engine of one of the motor vehicles. It may be specified, for example, that a leak in an intake tract of the internal combustion engine with exhaust gas turbocharger shall be detectable by a control device of the internal combustion engine itself.

SUMMARY

According to various embodiments, a diagnostic method and a device for performing diagnostics on the intake tract of an internal combustion engine with exhaust gas turbocharger can be created, said method and device enabling a leak in the intake tract of the internal combustion engine to be detected.

According to an embodiment, in a diagnostic method for performing diagnostics on the intake tract of an internal combustion engine with exhaust gas turbocharger comprising a compressor disposed in the intake tract and a turbine disposed in an exhaust tract of the internal combustion engine for the purpose of driving said compressor, a boost pressure of the compressor is determined in a predefined operating state of the internal combustion engine and wherein a leak is detected in the intake tract downstream of the compressor if the boost pressure determined is less than a predefined base boost pressure in the predefined operating state.

According to a further embodiment, the exhaust tract may incorporate a turbine bypass with a turbine bypass valve by means of which exhaust gas can be diverted round the turbine as a function of a degree of opening of the turbine bypass valve, and the predefined operating state of the internal combustion engine can be brought about by predefined actuation of a valve positioner for adjusting the position of the turbine bypass valve and by opening of the throttle valve. According to a further embodiment, a degree of opening of the turbine bypass valve may depend on a balance of forces which results from an opening first force which the exhaust gas exerts on the turbine bypass valve, from a closing second force which a pressure capsule spring exerts on a pressure capsule transfer port or on a diaphragm mounted thereon which separates an ambient pressure volume from an input pressure volume inside the valve positioner, and from an opening third force which is produced by a pressure difference between an ambient pressure in the ambient pressure volume and an input pressure in the input pressure volume, and during the predefined actuation of the valve positioner the boost pressure can be applied to the input pressure volume. According to a further embodiment, the boost pressure and the base boost pressure can be normalized to an ambient pressure and the leak in the intake tract can be detected on the basis of a comparison of the normalized boost pressure with the normalized base boost pressure.

According to another embodiment, a device for performing diagnostics on the intake tract of an internal combustion engine with exhaust gas turbocharger may comprise a compressor disposed in the intake tract and a turbine disposed in an exhaust tract of the internal combustion engine for the purpose of driving said compressor, wherein the device is embodied for determining a boost pressure of the compressor in a predefined operating state of the internal combustion engine and for detecting a leak in the intake tract downstream of the compressor if the boost pressure determined is less than a predefined base boost pressure in the predefined operating state.

BRIEF DESCRIPTION OF THE DRAWINGS

Exemplary embodiments of the invention will now be explained in greater detail with reference to the accompanying schematic drawings, in which:

FIG. 5 shows a flowchart of a second program for performing diagnostics on the intake tract of the internal combustion engine.

Elements of identical construction or function are identified by the same reference characters throughout the figures.

DETAILED DESCRIPTION

Figure 1:
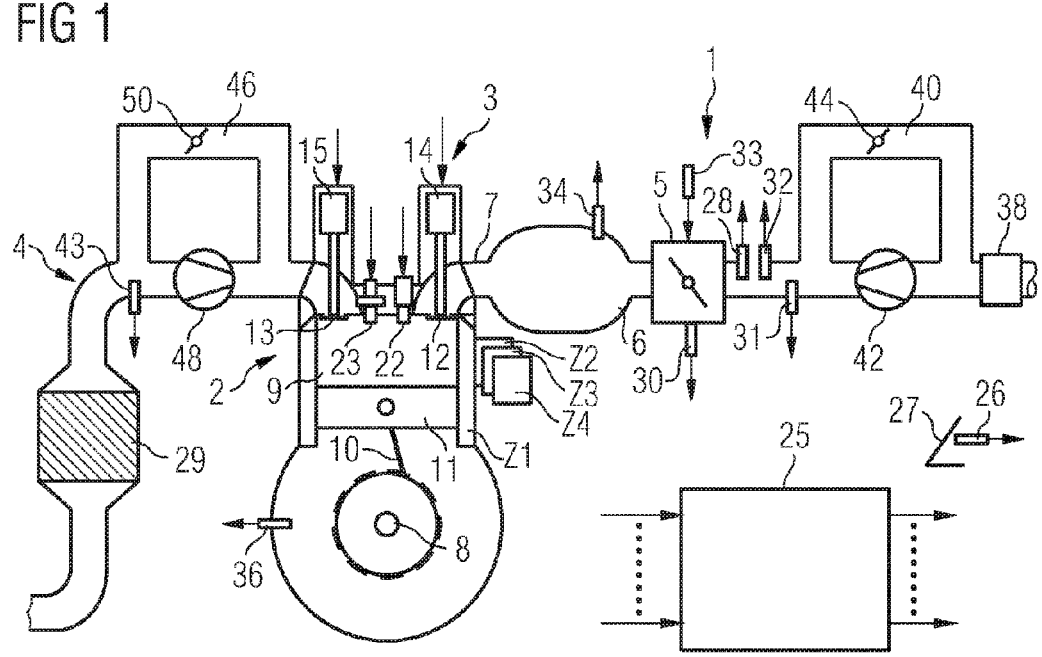
FIG. 1 shows an internal combustion engine.

According to various embodiments, a diagnostic method and a device perform diagnostics on the intake tract of an internal combustion engine with exhaust gas turbocharger. The exhaust gas turbocharger comprises a compressor disposed in the intake tract. For the purpose of driving the compressor, a turbine is disposed in an exhaust tract of the internal combustion engine. A compressor boost pressure is determined in a predefined operating state of the internal combustion engine. A leak in the intake tract downstream of the compressor is detected if the boost pressure determined is less than a predefined base boost pressure in the predefined operating state.

This enables the leak in the intake tract downstream of the compressor to be detected during operation of the internal combustion engine. In conjunction with a method for detecting a leak in the intake tract downstream of a throttle valve of the internal combustion engine, this allows the leak to be detected upstream of the throttle valve and downstream of the compressor. The base boost pressure represents the pressure downstream of the compressor and upstream of the throttle valve during predefined operation of the internal combustion engine with an at least approximately open throttle valve, e.g.

during full load operation and/or dethrottled, and with predefined actuation, preferably producing minimal turbine output, of a valve positioner for adjusting the position of a turbine bypass valve of the internal combustion engine. The predefined operation corresponds to the predefined operating state for a fault-free internal combustion engine.

In an embodiment, the exhaust tract comprises a turbine bypass containing the turbine bypass valve. By means of the turbine bypass, exhaust gas can be diverted round the turbine depending on a degree of opening of the turbine bypass valve. The predefined operating state of the internal combustion engine is brought about by the predefined actuation of the valve positioner for adjusting the position of the turbine bypass valve and by opening of the throttle valve. This can help to detect the leak in a particularly reliable manner, in particular without an additional sensor needing to be provided for detecting the leak. The exhaust gas diverted through the turbine bypass does not contribute to driving the turbine. The predefined actuation of the valve positioner involves continuous adjustment of the valve positioner.

In another embodiment, a degree of opening of the turbine bypass valve depends on a balance of forces. The balance of forces results from an opening first force, a closing second force and an opening third force. The opening first force is exerted by the exhaust gas on the turbine bypass valve. The closing second force is exerted by a pressure capsule spring on a pressure capsule transfer port or a diaphragm mounted thereon which separates an ambient pressure volume from an input pressure volume inside the valve positioner. The opening third force is produced by a pressure difference between an ambient pressure in the ambient pressure volume and an input pressure in the input pressure volume. By means of the predefined actuation of the valve positioner, the boost pressure is applied to the input pressure volume. This provides a particularly simple and reliable means of detecting the leak. The pressure capsule spring and the diaphragm are mechanically linked to a pressure capsule transfer port. The pressure capsule transfer port links a pressure capsule, in which the pressure capsule spring and the diaphragm are disposed, to the turbine bypass valve. The pressure capsule spring therefore exerts the closing second force on the turbine bypass valve via the pressure capsule transfer port.

In another embodiment, the boost pressure and the base boost pressure are normalized to ambient pressure. The leak in the intake tract is detected by comparing the normalized boost pressure with the normalized base boost pressure. This makes for particularly reliable leak detection.

An internal combustion engine (FIG. 1) comprises an intake tract 1, an engine block 2, a cylinder head 3 and an exhaust tract 4. The intake tract 4 preferably incorporates a throttle valve 5, as well as a plenum chamber 6 and an intake runner 7 which leads to a combustion chamber 9 of a cylinder Z1 via an intake port in the engine block 2. The engine block 2 additionally comprises a crankshaft 8 which is linked to a piston 11 of the cylinder Z1 via a connecting rod 10. In the exhaust tract 4 there is preferably disposed a catalytic converter 29 which is implemented e.g. as a three-way catalytic converter. In addition to the cylinder Z1, one or more further cylinders Z2-Z4 may be provided. Moreover, any number of cylinders Z1-Z4 may be provided.

The cylinder head 3 comprises a valve train with gas exchange valves, which are gas intake valves 12 and gas outlet valves 13, and valve operating mechanisms 14, 15 assigned thereto. The cylinder head 3 additionally incorporates an injection valve 22 and a spark plug 23. If the internal combustion engine is a diesel engine, the internal combustion engine can also have no spark plug 23. Alternatively, the injection valve 22 can also be disposed in the intake runner 7.

A control device 25 is provided to which sensors are assigned which detect different measured variables and in each case determine the value of the measured variable. Operating variables comprise the measured variables and variables derived from said measured variables. As a function of at least one of the measured variables, the control device 25 determines manipulated variables which are then converted into one or more actuating signals for controlling the final control elements by means of corresponding actuators. The control device 25 can also be termed a device for operating the internal combustion engine and/or a device for performing diagnostics on the intake tract 1. An operating state of the internal combustion engine can be predefined as a function of the actuating signals.

Figure 2:
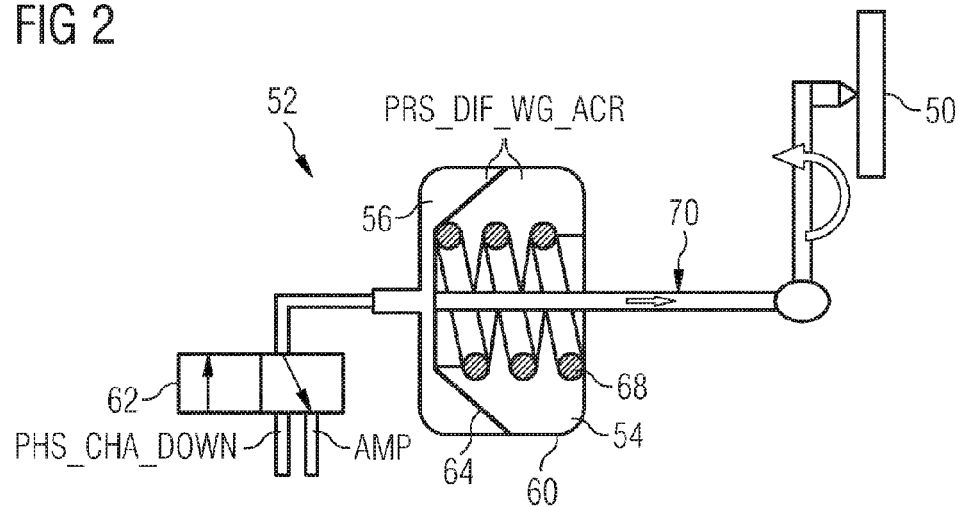
FIG. 2 shows a valve positioner for adjusting the position of a turbine bypass valve.

The sensors are a pedal position transducer 26 which detects a position of an accelerator pedal 27, a mass air flow meter 28 which detects a mass air flow upstream of the throttle valve 5, a throttle valve position sensor 30 which detects a degree of opening of the throttle valve 5, a boost pressure sensor 31 which detects a boost pressure PHS_CHA_DOWN (FIG. 2) upstream of the throttle valve 5 and downstream of a compressor 42, a temperature sensor 32 which detects an intake air temperature, an intake runner pressure sensor 34 which detects an intake runner pressure in the plenum chamber 6, a crankshaft angle sensor 36 which detects a crankshaft angle to which an engine speed is then assigned. In addition, a lambda probe 43 can be provided whose measurement signal is indicative of an air/fuel ratio of an exhaust gas of the internal combustion engine.

Any subset of the abovementioned sensors can be present or additional sensors can also be provided depending on the embodiment variant of the invention.

The final control elements are, for example, a throttle valve positioner 33 for adjusting the position of the throttle valve 5, the gas intake and outlet valves 12, 13, the injection valve 22, the spark plug 23, a positioner for adjusting the position of a compressor bypass valve 44 and/or a valve positioner 52 (FIG. 2) for adjusting the position of a turbine bypass valve 50.

The compressor 42 is disposed in the intake tract 1 upstream of the throttle valve 5 and downstream of an air filter 38. After passing through the compressor 42, fresh air can be fed back around the compressor 42 via a compressor bypass 40 as a function of a predefined actuation of the positioner for adjusting the position of the compressor bypass valve 44 such that the fresh air passed through the compressor 42 is not compressed in the volume following the compressor 42.

An exhaust gas turbocharger comprises the compressor 42 and a turbine 48 which is linked to the compressor 42 for the purpose of driving the compressor 42 and which is disposed in the exhaust tract 4 such that it can be driven by the exhaust gas from a combustion process in the combustion chamber 9. The exhaust gas can be diverted round the turbine 48 via a turbine bypass 46 such that the exhaust gas fed through the turbine bypass 46 does not drive the turbine 48. The exhaust gas turbine 48 is diverted round the turbine 48 as a function of the predefined actuation of the valve positioner 52.

The turbine bypass valve 50 can also be termed a waste gate. The turbine bypass valve 50 is linked to the valve positioner 52 for adjusting the position of the turbine bypass valve 50. The valve positioner 52 (FIG. 2) preferably comprises a pressure capsule 60, a pressure capsule valve 62 and a pressure capsule transfer port 70. The pressure capsule 60 comprises an ambient pressure volume 54 and an input pressure volume 56. The ambient pressure volume 54 and the input pressure volume 56 are separated from one another by a diaphragm 64. The diaphragm 64 is preferably linked to a pressure capsule spring 68 and to the pressure capsule transfer port 70. Depending on a position of the pressure capsule valve 62, the boost pressure PHS_CHA_DOWN of the compressor 42 or an ambient pressure AMP of an ambient air of the internal combustion engine can be applied to the input pressure volume 56. The ambient pressure AMP is also applied to the ambient pressure volume 54 of the pressure capsule 60.

A first opening force can be exerted on the turbine bypass valve 50 by the exhaust gas of the internal combustion engine depending on an operating point of the internal combustion engine. Opening means in this context that the force is exerted on the turbine bypass valve 50 in the opening direction of the turbine bypass valve 50.

The pressure capsule spring 68 is preferably disposed such that its spring force keeps the input pressure volume 56 as small as possible and that it applies a closing second force to the turbine bypass valve 50 in the closing direction of the turbine bypass valve 50 via the pressure capsule transfer port 70.

If the pressure capsule valve 62 is in its normal position in which the ambient pressure AMP is applied to the input pressure volume 56 and is indicative of a normal position of the valve positioner 52, the ambient pressure AMP obtains in the input pressure volume 56 and the ambient pressure volume 54. Therefore, because of the pressure in the pressure capsule 60, no force is exerted on the diaphragm 64.

If the pressure capsule valve 62 is in a predefined position in which the boost pressure PHS_CHA_DOWN is applied to the input pressure volume 56 and which is indicative of the predefined actuation of the valve positioner 52, the boost pressure PHS_CHA_DOWN is applied to the input pressure volume 56. As during fault-free operation of the internal combustion engine the boost pressure PHS_CHA_DOWN is greater than the ambient pressure AMP, a pressure difference PRS_DIF_WG_ACR between the ambient pressure AMP and the boost pressure PHS_CHA_DOWN is created in the pressure capsule 60. Said pressure difference PRS_DIF_WG_ACR produces an opening third force on the diaphragm 64 such that the input pressure volume 56 is enlarged, the pressure capsule spring 68 is compressed and a force is applied to the pressure capsule transfer port 70 such that the pressure capsule transfer port 70 applies an opening third force to the turbine bypass valve 50, said force acting in the opening direction of said turbine bypass valve 50.

In the normal position, the pressure capsule valve 62 is set such that the ambient pressure AMP is applied to the input pressure volume 56. Therefore, in the normal position only the opening first and the closing second force act on the turbine bypass valve 50. Thus, by selecting the designed spring stiffness sufficiently high, the turbine bypass valve 50 is closed in the normal position of the pressure capsule valve 62. As a result of the turbine bypass valve 50 being closed, all the exhaust gas is passed through the turbine 48 and drives the turbine 48. The turbine 48 drives the compressor 42 which, with the compressor bypass valve 44 closed, builds up the boost pressure PHS_CHA_DOWN downstream of the compressor 42. The boost pressure PHS_CHA_DOWN can, for example, help to increase internal combustion engine output and/or efficiency.

If the pressure capsule valve 62 is in the predefined position in which the boost pressure PHS_CHA_DOWN is applied to the input pressure volume 56, the turbine bypass valve 50 opens as soon as the balance of forces from the three forces acting on the turbine bypass valve 50 is shifted in favor of the opening third force. In other words, the turbine bypass valve 50 opens as soon as the opening third force, because of the pressure difference PRS_DIF_WG_ACR acting on the diaphragm 64, is greater than the force of the pressure capsule spring 68 acting on the diaphragm 64, reduced by the force exerted by the exhaust gas on the turbine bypass valve 50.

As soon as the turbine bypass valve 50 moves out of its closed position, exhaust gas is diverted round the turbine 48 via the turbine bypass 46. This causes a reduction in the speed of the turbine 48 and consequently a reduction in the speed of the compressor 42. Therefore, the boost pressure PHS_CHA_DOWN also falls. This results in a reduction in the pressure difference PRS_DIF_WG_ACR and, after a short period of time during which the boost pressure PHS_CHA_DOWN is applied to the input pressure volume 56, leads to closure of the turbine bypass valve 50. This causes the pressure difference PRS_DIF_WG_ACR to build up again.

During fault-free operation of the internal combustion engine, a dynamic equilibrium therefore comes into being between the three forces acting on the turbine bypass valve 50 if the valve positioner 52, in particular the pressure capsule valve 62, is in the predefined position. A dynamic equilibrium likewise arises with a predefined degree of opening of the turbine bypass valve 50. In this context, the dynamic equilibrium means that, although the pressure difference PRS_DIF_WG_ACR and the degree of opening of the turbine bypass valve 50 need not necessarily have the same absolute value, a slight oscillation about a fixed constant value can take place.

Because of these dynamic equilibria, particularly because of the spring force of the pressure capsule spring 68 and the force of the exhaust gas pressure, the compressor 42 basically builds up the boost pressure PHS_CHA_DOWN irrespective of the position of the pressure capsule valve 62.

During operation of the internal combustion engine in which the throttle valve positioner 33 is preferably triggered such that throttling of the sucked-in fresh air via the throttle valve 5 is minimal, a flow rate of the air sucked in via the combustion chamber 9 corresponds to a volume flow rate VOL_FLOW_CHA_RED (FIG. 3) via the compressor 42. The flow rate VOL_FLOW_CHA_RED via the compressor 42 therefore depends on the speed of the internal combustion engine.

Figure 3:
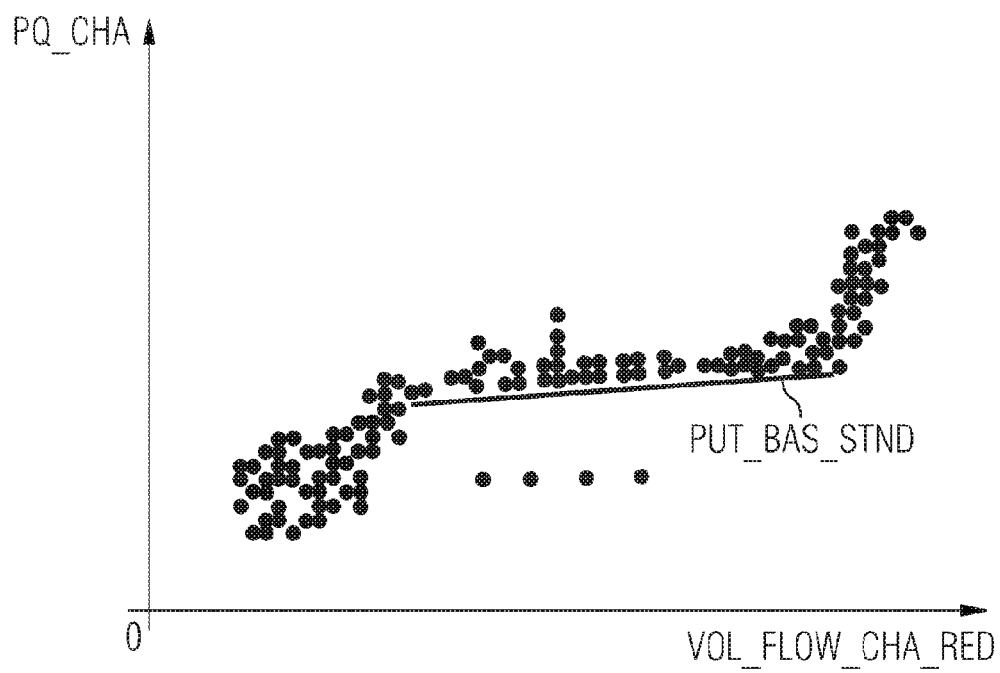
FIG. 3 shows a compressor map.

A base boost pressure PUT_BAS is the boost pressure PHS_CHA_DOWN which the compressor 42 builds up during dethrottled operation and with the predefined actuation of the valve positioner 52. The base boost pressure PUT_BAS therefore also depends on the speed of the internal combustion engine and on the flow rate VOL_FLOW_CHA_RED via the compressor 42. If the base boost pressure PUT_BAS is normalized to the ambient pressure AMP and a normalized base boost pressure PUT_BAS_STND is plotted against the flow rate VOL_FLOW_CHA_RED through the compressor 42, a straight line is obtained in a compressor map (FIG. 3).

If the boost pressure PHS_CHA_DOWN is now determined, e.g. using the boost pressure sensor 31, in a predefined operating state in which the internal combustion engine is preferably operated at full load and in which the valve positioner 52 is triggered in a predefined manner, and if the boost pressure PHS_CHA_DOWN is normalized to the ambient pressure AMP and said normalized boost pressure PQ_CHA is below the normalized base boost pressure PUT_BAS_STND in the compressor map, this indicates that the boost pressure PHS_CHA_DOWN downstream of the compressor 42 and upstream of the gas intake valve 12 is too low. The excessively low boost pressure PHS_CHA_DOWN then results from an unwanted mass flow of air from the intake tract 1 downstream of the compressor 42. The unwanted mass air flow from the intake tract 1 can only leave the latter due to a leak.

Alternatively to the normalized base boost pressure PUT_BAS_STND and the normalized boost pressure PQ_CHA, the base boost pressure PUT_BAS and the boost pressure PHS_CHA_DOWN can also be plotted in the compressor map.

Figure 4:
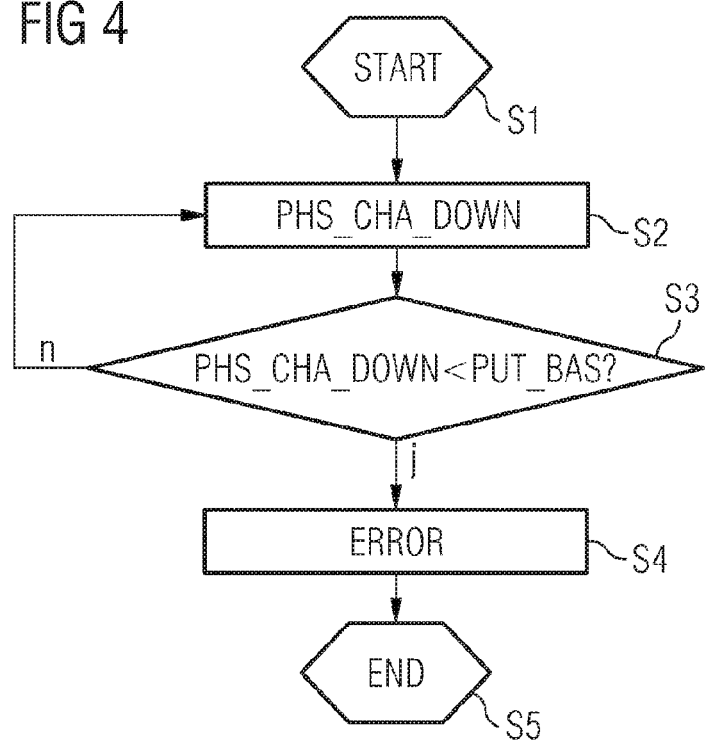
FIG. 4 shows a flowchart of a first program for performing diagnostics on the intake tract of the internal combustion engine.

A first program for performing diagnostics on the intake tract 1 is preferably stored on a storage medium of the control device 25. The first program is preferably launched in a step S1 (FIG. 4) in which variables are initialized if necessary.

In a step S2, the boost pressure PHS_CHA_DOWN is determined, preferably using the boost pressure sensor 31. Alternatively, the boost pressure PHS_CHA_DOWN can be determined by means of an intake runner filling model from a measured intake runner pressure. For example, on the basis of the intake runner filling model, the boost pressure PHS_CHA_DOWN can be determined as a function of at least one of the measured variables, e.g. as a function of the degree of opening of the throttle valve 5. Alternatively or additionally, the intake runner model is used to determine a mass flow of air into the combustion chamber 9 as a function of the degree of opening of the throttle valve 5.

In a step S3, it is checked whether the determined boost pressure PHS_CHA_DOWN is less than the base boost pressure PUT_BAS, preferably by means of the compressor map. If the condition of step S3 is met, processing is continued in a step S4. If the condition of step S3 is not met, processing is resumed in step S2.

In step S4, an error message ERROR is generated which is indicative of the leak in the intake tract 1 downstream of the compressor 42. The error message ERROR can be notified to a driver of the motor vehicle in which the internal combustion engine is typically disposed and/or result in an error entry in an error memory of the control device 25.

The first program can be terminated in a step S5.

Alternatively or additionally, a second program for performing diagnostics on the intake tract 1 is stored on the storage medium of the control device 25.

The second program is preferably launched in a step S6 (FIG. 5) in which variables are initialized if necessary.

In a step S7, an actuating signal SIG_THR_ACR for the throttle valve positioner 33 is generated such that the internal combustion engine is operated in dethrottled mode and/or in full load mode.

In a step S8, an actuating signal SIG_WG_ACR for the valve positioner 52 is generated such that the valve positioner 52, in particular the pressure capsule valve 62, is placed in the predefined position in which the boost pressure PHS_CHA_DOWN is applied to the input pressure volume 56. The internal combustion engine is therefore now in the predefined operating state in which the base boost pressure PUT_BAS can be determined during fault-free operation of the internal combustion engine.

In a step S9, the boost pressure PHS_CHA_DOWN is determined in a manner corresponding to step S2 of the first program.

In a step S10, a pressure PHS_AIC_DOWN downstream of the air filter 38 and upstream of the compressor 42 is determined as a function of the ambient pressure AMP and as a function of a pressure drop PRS_FIL across the air filter 38, preferably by means of the calculation rule specified in step S10. Although the pressure PHS_AIC_DOWN of the air filter 38 can be determined using a corresponding sensor, the pressure PHS_AIC_DOWN downstream of the air filter 38 is preferably determined by means of a model calculation or a map. The map and possibly further maps as well as the model calculation and possibly further model calculations can preferably be determined or rather plotted on an engine test block. The model calculation can include, for example, the intake runner filling model.

In a step S11, the normalized base boost pressure PUT_BAS_STND is determined as a function of the pressure PHS_AIC_DOWN downstream of the air filter 38 and as a function of the boost pressure PHS_CHA_DOWN downstream of the compressor 42, preferably in accordance with the calculation rule specified in step 511.

In a step S12, the normalized base boost pressure PUT_BAS_STND is determined as a function of the base boost pressure PUT_BAS and the ambient pressure AMP, preferably in accordance with the calculation rule specified in step S12.

In a step S13, it is checked whether the normalized boost pressure PQ_CHA is less than the normalized base boost pressure PUT_BAS_STND, preferably by means of the compressor map. If the condition of step S13 is met, processing is continued in a step S14. If the condition of step S13 is not met, processing is resumed in step S9.

In step S14, the error message ERROR is produced in accordance with step S4 of the first program.

In a step S15, the second program can be terminated.

The first and/or the second program are preferably executed regularly during operation of the internal combustion engine. In addition, the first and/or the second program are linked to at least one further program for performing diagnostics on the intake tract 1, by means of which a leak in the intake tract 1 downstream of the throttle valve 5 can be detected. This enables the leak downstream of the compressor 42 and upstream of the throttle valve 5 to be detected. The additional program can be based, for example, on analysis and/or plausibility checking of the intake runner filling model.

The invention is not limited to the disclosed exemplary embodiments. For example, alternatively to the valve positioner 52, another final control element can be provided for adjusting the position of the turbine bypass valve 50. In addition the first and/or the second program can be implemented in a further program and/or subdivided into subroutines.

What is claimed is:

1. A diagnostic method for performing diagnostics on the intake tract of an internal combustion engine with exhaust gas turbocharger comprising a compressor disposed in the intake tract and a turbine disposed in an exhaust tract of the internal combustion engine for the purpose of driving said compressor, the method comprising the steps of:
   determining a boost pressure of the compressor in a predefined operating state of the internal combustion engine,
   comparing the determined boost pressure to a predefined base boost pressure in the predefined operating state, and
   detecting a leak in the intake tract downstream of the compressor in response to determining that the determined boost pressure is less than the predefined base boost pressure in the predefined operating state.

2. The diagnostic method according to claim 1, wherein the exhaust tract incorporates a turbine bypass with a turbine bypass valve by means of which exhaust gas can be diverted round the turbine as a function of a degree of opening of the turbine bypass valve, and wherein the predefined operating state of the internal combustion engine is brought about by predefined actuation of a valve positioner for adjusting the position of the turbine bypass valve and by opening of the throttle valve.

3. The diagnostic method according to claim 2, wherein
a degree of opening of the turbine bypass valve depends on a balance of forces which results from an opening first force which the exhaust gas exerts on the turbine bypass valve, from a closing second force which a pressure capsule spring exerts on a pressure capsule transfer port or on a diaphragm mounted thereon which separates an ambient pressure volume from an input pressure volume inside the valve positioner, and from an opening third force which is produced by a pressure difference between an ambient pressure in the ambient pressure volume and an input pressure in the input pressure volume, during the predefined actuation of the valve positioner the boost pressure is applied to the input pressure volume.

4. The diagnostic method according to claim 1, wherein the boost pressure and the base boost pressure are normalized to an ambient pressure and wherein the leak in the intake tract is detected on the basis of a comparison of the normalized boost pressure with the normalized base boost pressure.

5. A device for performing diagnostics on the intake tract of an internal combustion engine with exhaust gas turbocharger comprising a compressor disposed in the intake tract and a turbine disposed in an exhaust tract of the internal combustion engine for the purpose of driving said compressor, wherein the device is operable:
to determine a boost pressure of the compressor in a predefined operating state of the internal combustion engine, and
to compare the determined boost pressure to a predefined base boost pressure in the predefined operating state, and
to detect a leak in the intake tract downstream of the compressor in response to determining that the determined boost pressure is less than the predefined base boost pressure in the predefined operating state.

6. The device according to claim 5, wherein the exhaust tract incorporates a turbine bypass with a turbine bypass valve by means of which exhaust gas can be diverted round the turbine as a function of a degree of opening of the turbine bypass valve, and wherein the predefined operating state of the internal combustion engine is brought about by predefined actuation of a valve positioner for adjusting the position of the turbine bypass valve and by opening of the throttle valve.

7. The device according to claim 6, wherein a degree of opening of the turbine bypass valve depends on a balance of forces which results from an opening first force which the exhaust gas exerts on the turbine bypass valve, from a closing second force which a pressure capsule spring exerts on a pressure capsule transfer port or on a diaphragm mounted thereon which separates an ambient pressure volume from an input pressure volume inside the valve positioner, and from an opening third force which is produced by a pressure difference between an ambient pressure in the ambient pressure volume and an input pressure in the input pressure volume, during the predefined actuation of the valve positioner the boost pressure is applied to the input pressure volume.

8. The device according to claim 5, wherein the boost pressure and the base boost pressure are normalized to an ambient pressure and wherein the leak in the intake tract is detected on the basis of a comparison of the normalized boost pressure with the normalized base boost pressure.

9. A device for performing diagnostics on the intake tract of an internal combustion engine with exhaust gas turbocharger comprising a compressor disposed in the intake tract, a turbine disposed in an exhaust tract of the internal combustion engine for the purpose of driving said compressor, and a pressure sensor determining a boost pressure of the compressor in a predefined operating state of the internal combustion engine, wherein the device is operable to:
comparing the boost pressure determined by the pressure sensor to a predefined base boost pressure in the predefined operating state, and
detect a leak in the intake tract downstream of the compressor in response to determining that the boost pressure determined by the pressure sensor is less than the predefined base boost pressure in the predefined operating state.

10. The device according to claim 9, wherein the exhaust tract incorporates a turbine bypass with a turbine bypass valve by means of which exhaust gas can be diverted round the turbine as a function of a degree of opening of the turbine bypass valve, and wherein the predefined operating state of the internal combustion engine is brought about by predefined actuation of a valve positioner for adjusting the position of the turbine bypass valve and by opening of the throttle valve.

11. The device according to claim 10, wherein a degree of opening of the turbine bypass valve depends on a balance of forces which results from an opening first force which the exhaust gas exerts on the turbine bypass valve, from a closing second force which a pressure capsule spring exerts on a pressure capsule transfer port or on a diaphragm mounted thereon which separates an ambient pressure volume from an input pressure volume inside the valve positioner, and from an opening third force which is produced by a pressure difference between an ambient pressure in the ambient pressure volume and an input pressure in the input pressure volume, during the predefined actuation of the valve positioner the boost pressure is applied to the input pressure volume.

12. The device according to claim 9, wherein the boost pressure and the base boost pressure are normalized to an ambient pressure and wherein the leak in the intake tract is detected on the basis of a comparison of the normalized boost pressure with the normalized base boost pressure.

* * * * *